(12) United States Patent
Sip

(10) Patent No.: US 9,292,943 B2
(45) Date of Patent: Mar. 22, 2016

(54) AUTOMATIC METHOD OF SETTING A DESKTOP BACKGROUND COLOR AND ELECTRONIC DEVICE FOR USING THE SAME

(71) Applicant: Acer Inc., New Taipei (TW)

(72) Inventor: Kim Yeung Sip, New Taipei (TW)

(73) Assignee: Acer Inc., New Taipei (TW)

( * ) Notice: Subject to any disclaimer, the term of this patent is extended or adjusted under 35 U.S.C. 154(b) by 161 days.

(21) Appl. No.: 14/248,383

(22) Filed: Apr. 9, 2014

(65) Prior Publication Data

US 2015/0161803 A1    Jun. 11, 2015

(30) Foreign Application Priority Data

Dec. 6, 2013 (TW) .............................. 102144789 A

(51) Int. Cl.
*G06F 3/0488* (2013.01)
*G06F 3/039* (2013.01)
*G06F 3/041* (2006.01)
*G06T 11/00* (2006.01)

(52) U.S. Cl.
CPC ............... *G06T 11/001* (2013.01); *G06F 3/039* (2013.01); *G06F 3/0416* (2013.01); *G06F 3/0488* (2013.01)

(58) Field of Classification Search
CPC ..................................................... G06T 11/001
See application file for complete search history.

(56) References Cited

U.S. PATENT DOCUMENTS

| | | | | |
|---|---|---|---|---|
| 2009/0015593 A1* | 1/2009 | Kang | ................... | G06F 3/0481 345/581 |
| 2013/0314349 A1 | 11/2013 | Chien et al. | | |
| 2013/0315419 A1 | 11/2013 | Chien et al. | | |
| 2013/0328917 A1* | 12/2013 | Zambetti | ............... | G06F 1/1626 345/620 |
| 2014/0267383 A1* | 9/2014 | Javidan | ............... | H04M 1/0283 345/619 |
| 2015/0065890 A1* | 3/2015 | Ishikawa | ............... | A61B 5/0062 600/479 |

FOREIGN PATENT DOCUMENTS

CN            203224818 U    10/2013

* cited by examiner

*Primary Examiner* — Zhengxi Liu
*Assistant Examiner* — Grace Q Li
(74) *Attorney, Agent, or Firm* — Alan D. Kamrath; Kamrath IP Lawfirm, P.A.

(57) ABSTRACT

An automatic method of setting a desktop background color is disclosed. The method is used for setting a desktop background color of an electronic device such that the desktop background color corresponds to a color of a protective cover, wherein a cover body of the protective cover for covering a touch screen of the electronic device has a conducting area and a non-conducting area. The method includes the following steps: receiving protective cover information generated by the touch screen touching the conducting area; determining whether the protective cover information is in accordance with one of a plurality of preset protective cover information stored in the electronic device; if the protective cover information is in accordance with one of the plurality of preset protective cover information, setting the desktop background color displayed by the touch screen according to color information corresponding to the preset protective cover information.

10 Claims, 6 Drawing Sheets

| preset protective cover information | color information |
|---|---|
| 0000 | blue |
| 0001 | green |
| 0010 | red |

FIG. 4

AUTOMATIC METHOD OF SETTING A DESKTOP BACKGROUND COLOR AND ELECTRONIC DEVICE FOR USING THE SAME

BACKGROUND OF THE INVENTION

1. Field of the Invention

The present invention relates to a method of setting a desktop background color of an electronic device; in particular, the method relates to an automatic method of setting a desktop background color used for setting a desktop background color of an electronic device such that the desktop background color is consistent with a color of a protective cover combined with the electronic device.

2. Description of the Related Art

Portability has become an important goal in the development of computer technologies. Especially, the development of tablet computers and smart phones further leads people into a new era of portable electronics and deeply impacts people's computer use habits today. Typically, when people use a tablet computer, they also use a protective cover. Combining the protective cover with the tablet computer can protect the tablet computer so as to prevent a screen and a casing of the tablet computer from being scratched or damaged. On the other hand, the protective cover can also provide a function of supporting an electronic device to keep the tablet computer standing at an oblique angle or standing upright.

As the tablet computer becomes more popular, more types of protective covers are introduced. In addition, protective covers of the same type may be available in a variety of colors in order to satisfy different consumers' preferences.

Currently, a desktop background color of a tablet computer is predetermined in the factory when users start using the tablet computer. If the users desire to change the desktop background color, the users have to set the color manually. In addition, when a protective cover is used for covering a tablet, it is aesthetically pleasing for the users if the desktop background color is consistent with the color of the protective cover.

Therefore, it is necessary to provide a method for automatically setting a desktop background color according to the color of the protective cover.

SUMMARY OF THE INVENTION

The primary objective of the present invention is to provide an automatic method of setting a desktop background color used for setting a desktop background color of an electronic device such that the desktop background color displayed by a touch screen of the electronic device is consistent with a color of a protective cover combined with the electronic device.

Another objective of the present invention is to provide an electronic device having the abovementioned function of automatic setting of the desktop background color.

In order to achieve the above objective, the automatic method of setting a desktop background color is used for setting a desktop background color of an electronic device such that the desktop background color displayed by a touch screen of the electronic device is consistent with a color of a protective cover combined with the electronic device. A cover body of the protective cover used for covering the touch screen has a conducting area and a non-conducting area, wherein each protective cover of a different color has a different conducting area in terms of shape, location, or area corresponding to the color of the protective cover.

The automatic method of setting a desktop background color according to the present invention comprises the following steps: receiving protective cover information generated by the touch screen touching the conducting area; determining whether the protective cover information is in accordance with one of a preset plurality of preset protective cover information; and if the protective cover information is in accordance with one of the plurality of preset protective cover information, setting the desktop background color displayed by the touch screen according to the color information corresponding to the preset protective cover information such that the desktop background color is consistent with the color of the protective cover, wherein the corresponding relationship between the preset protective cover information and the color information is determined and stored in the electronic device in advance.

The present invention also provides an electronic device combined with a protective cover in use. The protective cover combined with the electronic device comprises a cover body, wherein the cover body has a conducting area and a non-conducting area, and each protective cover of a different color has a conducting area of the cover body that differs from the conducting areas of the cover bodies of protective covers of different colors in terms of shape, location, or area. The electronic device of the present invention comprises a main body, a touch screen, and a control system.

The main body is combined with the protective cover. The touch screen is connected with the main body. The touch screen is used for generating protective cover information after touching the conducting area. The control system is used for receiving the protective cover information and for determining whether the protective cover information is in accordance with one of a plurality of preset protective cover information after receiving the protective cover information; when the protective cover information is in accordance with one of the plurality of preset protective cover information, the control system sets the desktop background color displayed by the touch screen according to color information corresponding to the preset protective cover information such that the desktop background color is consistent with the color of the protective cover, wherein the corresponding relationship between the preset protective cover information and the color information is determined and stored in the electronic device in advance.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are provided for explanation and understanding only.

FIG. 4 is a lookup table illustrating the corresponding relationship between the preset protective cover information and the color information;

DETAILED DESCRIPTION OF THE PREFERRED EMBODIMENT

Figure 1:
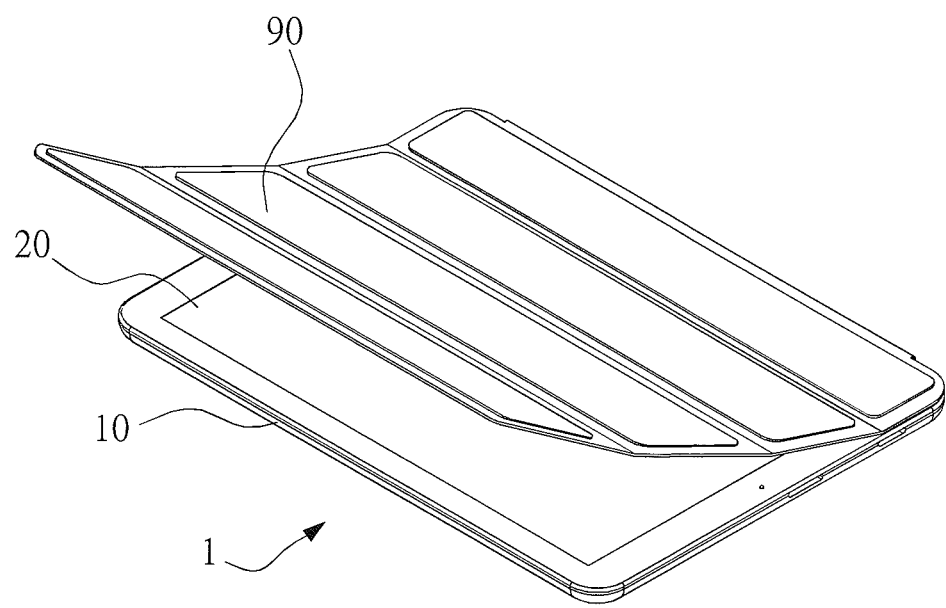
FIG. 1 is a top view of the electronic device according to the present invention when the electronic device combines with a protective cover in use.
Figure 2:
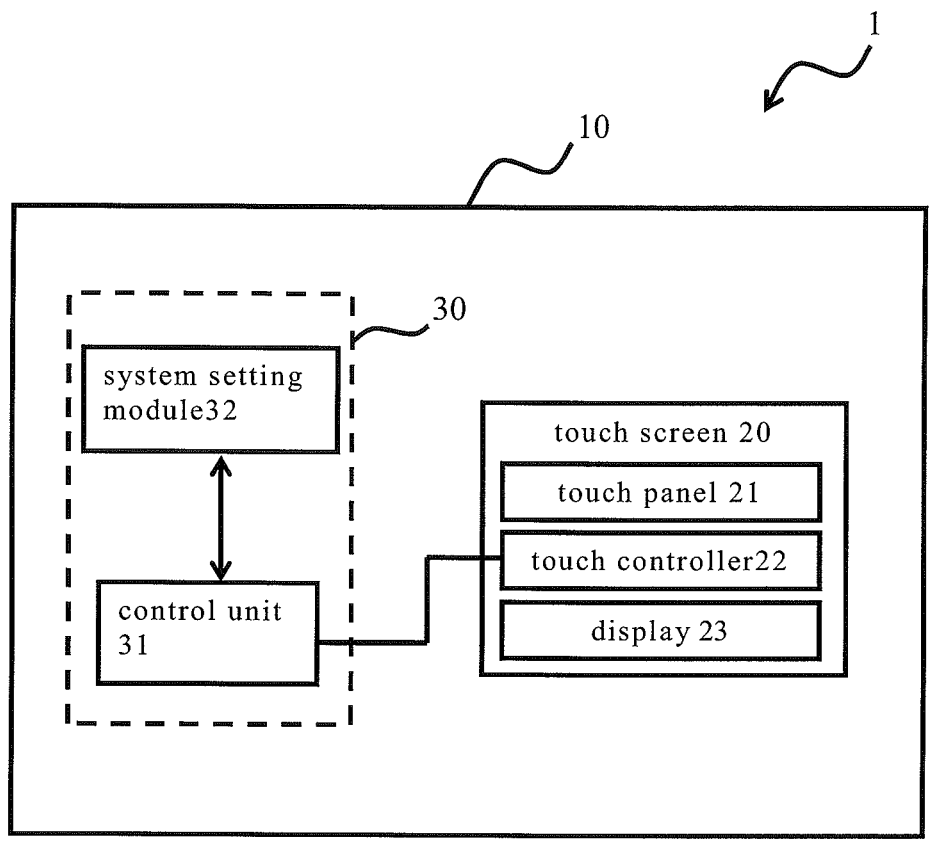
FIG. 2 is a device architecture diagram of the electronic device according to the present invention.
Figure 3:
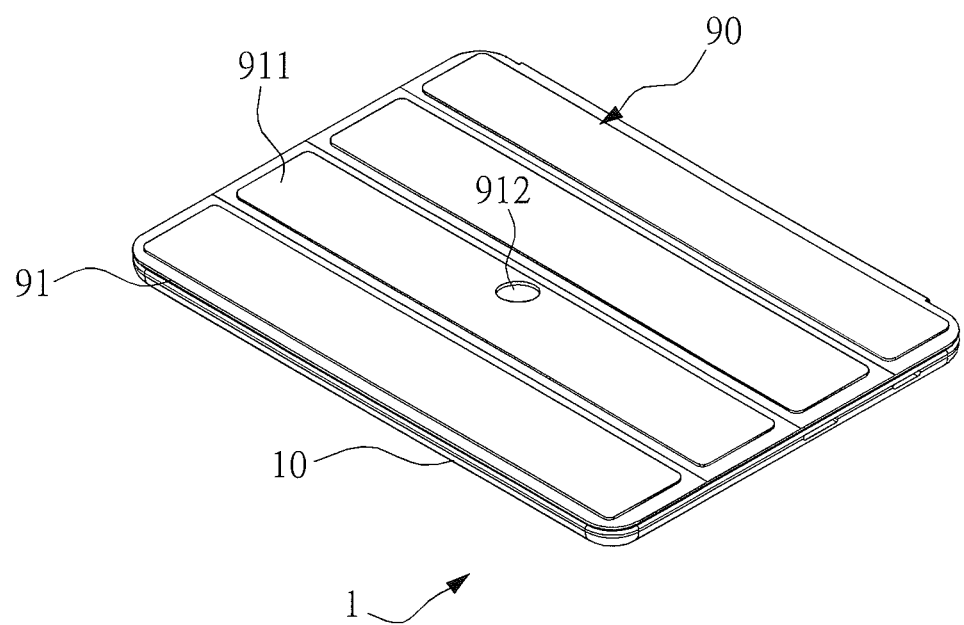
FIG. 3 is an implementation schematic diagram of the protective cover combined with the electronic device according to the present invention.

Please refer to FIG. 1 to FIG. 4; FIG. 1 is a top view of the electronic device according to the present invention when the electronic device combines with a protective cover in use; FIG. 2 is a device architecture diagram of the electronic device according to the present invention; FIG. 3 is an implementation schematic diagram of the protective cover combined with the electronic device according to the present invention; and FIG. 4 is a lookup table illustrating the corresponding relationship between the preset protective cover information and the color information.

As shown in FIG. 1, the electronic device 1 of the present invention can be combined with a protective cover 90 in use. In a specific embodiment of the present invention, the electronic device 1 is a tablet computer, but the scope of the present invention is not limited thereto.

As shown in FIG. 1 and FIG. 2, in an embodiment of the present invention, the electronic device 1 comprises a main body 10, a touch screen 20, and a control system 30, wherein the main body 10 can be combined with the protective cover 90.

The touch screen 20 is connected with the main body 10. The touch screen 20 comprises a touch panel 21, a touch controller 22, and a display 23. The touch panel 21 is used for generating coordinate sensing signals when the touch panel 21 is touched by a conductive object. The touch controller 22 is electrically coupled to the touch panel 21. The touch controller 22 is used for generating protective cover information according to the coordinate sensing signals generated by the touch panel 21 and for transferring the protective cover information to the control system 30. The display 23 is used for displaying desktop background colors and visual images. The principles and the detailed characteristics of the touch screen 20 are known technologies to people who are skilled in the art and are not repeated herein.

The control system 30 comprises a control unit 31 and a system setting module 32. The control unit 31 is used for receiving the protective cover information generated by the touch screen 20 and for determining whether the received protective cover information is in accordance with one of a plurality of preset protective cover information stored in the electronic device 1. In a specific embodiment of the present invention, the control unit 31 is an embedded controller (EC), but the scope of the present invention is not limited thereto. The preset protective cover information is detailed in the following description and is not elaborated here.

The system setting module 32 is used for setting the desktop background color displayed by the touch screen 20 of the electronic device 1 according to color information corresponding to the preset protective cover information when the received protective cover information is in accordance with one of the plurality of preset protective cover information. In a specific embodiment of the present invention, the system setting module 32 is an Advanced Configuration and Power Interface (ACPI), but the scope of the present invention is not limited thereto. The corresponding relationship between the preset protective cover information and the color information is detailed in the following description and is not elaborated here.

As shown in FIG. 3, in an embodiment of the present invention, the protective cover 90 combined with the electronic device 1 in use comprises a cover body 91. The cover body 91 comprises a conducting area 911 and a non-conducting area 912 formed by a through hole. The through hole is located in the central location of the cover body 91, and the shapes of the through hole are different according to the various colors of the protective covers. The shape of the through hole can be a circle, a rectangle, or a triangle. For example, if the through hole is a circle, the color of the protective cover 90 is green. If the through hole is a rectangle, the color of the protective cover 90 is red. If the through hole is a triangle, the color of the protective cover 90 is blue. However, the scope of the present invention is not limited to the abovementioned matching relationships. In a specific embodiment of the present invention, the conducting area 911 is formed by plastic materials mixed with conductive materials such as ABS resin, but the scope of the present invention is not limited thereto.

Please refer to FIG. 3 and FIG. 4; FIG. 4 is a lookup table illustrating the corresponding relationships between the preset protective cover information and the color information. As mentioned above, the cover body 91 used for covering the touch screen 20 of the electronic device 1 of the protective cover 90 is composed of a conducting area 911 and a non-conducting area 912. The shapes of the non-conducting areas 912 (i.e., the through holes) are different according to the colors of the protective cover 90. In other words, the shapes, locations, or areas of the conducting area 911 are different when the colors of the protective cover 90 are different. When the cover body 91 of a protective cover 90 of a different color touches the touch screen 20, the protective cover information generated by the touch screen 20 is different. That is to say, when a cover body 91 touches the touch screen 20, a cover body 91 having a conducting area of different shape, location, or area triggers the touch screen 20 to generate corresponding protective cover information. The protective cover information is generated by computation after integration of the coordinate sensing signals generated by the conducting area 911 touching the touch screen 20. In the example illustrated in FIG. 3 and FIG. 4, if the shape, the location, and the area of the through hole of the cover body 91 of the green protective cover 90 are as shown in FIG. 3, then the protective cover information generated by the conducting area 911 of the cover body 91 touching the touch screen 20 is set as 0001. In the current example, the color information corresponding to the preset protective cover information 0001 is set as green. If the conducting area 911 of the cover body 91 of a blue protective cover 90 touches the touch screen 20 and the touch screen 20 generates another protective cover information such as 0000, the color information corresponding to the preset protective cover information 0000 is set as blue, and so on. The shape, location, or area of the conducting area may vary depending on the color of the protective cover 90, so the protective cover information generated by the touch screen 20 touching a cover body 91 of a protective cover 90 of a different color is different too. As a result, by the above differences, the corresponding relationship between the protective cover information and the color information can be set in advance, as in the lookup table shown in FIG. 3, such that the control system 30 can determine whether the desktop background color needs to be changed and, if so, what color the desktop background color needs to be set to.

Figure 5A:
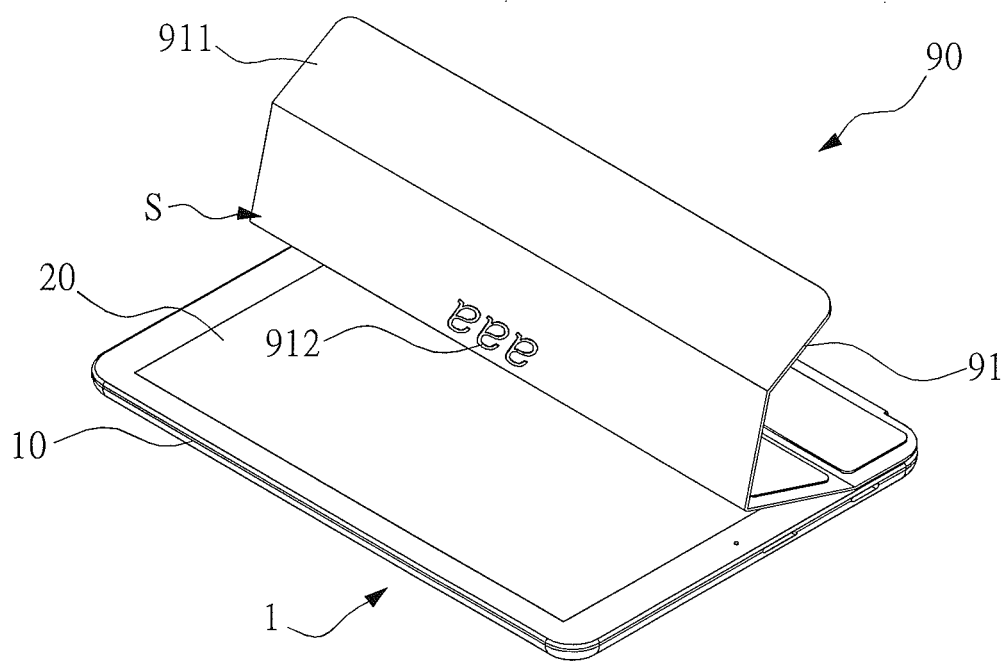
FIG. 5A is another implementation schematic diagram of the protective cover combined with the electronic device according to the present invention.
Figure 5B:
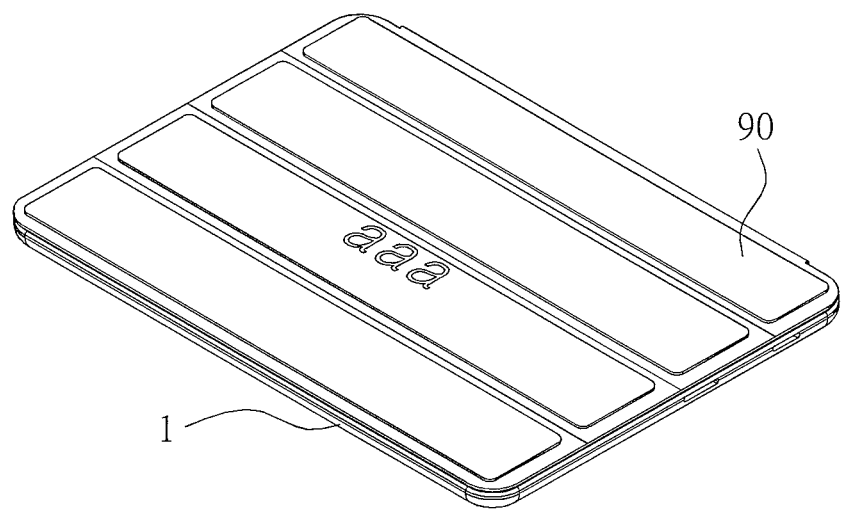
FIG. 5B is a schematic diagram illustrating the lifted cover body of the protective cover in FIG. 5A.

FIG. 5A and FIG. 5B are schematic diagrams of another embodiment of the protective cover combined with the electronic device in use.

As shown in FIG. 5A and FIG. 5B, in another embodiment of the present invention, the non-conducting area 912 of the cover body 91 of the protective cover 90 is located on an inner surface S touching the touch screen 20 when the cover body 91 covers the touch screen 20, and the shape of the non-conducting area 912 is a product logo. In this embodiment, it is assured that when a user purchases a brand of electronic device 1, such as the aaa brand, then if the user desires to use the method disclosed in the present invention, the user must purchase a protective cover 90 of the same brand. Similarly, in this embodiment, each product logo of the same brand matches a color according to the different graphic designs of each product logo. Each non-conducting area having different graphic designs enables the protective cover information generated by the touch screen 20 to be different. For example, assuming that the graphic design of the product logo of the cover body 91 shown in FIG. 5A matches the blue protective cover 90 in use, and that the non-conducting area 912 has a graphic design that can enable the touch screen 20 to generate the protective cover information after the inner surface S of the cover body 91 touches the touch screen 20, such as 0000, then the setting 0000 is the preset protective cover information, and the setting color information corresponding to the protective cover information is blue. Alternatively, the same product logo written with cursive script enables the touch screen 20 to generate other protective cover information when the inner surface S of the cover body 91 touches the touch screen 20, such as 0010. With reference to the lookup table in FIG. 4, the product logo written with cursive script matches the red protective cover 90. Via implementation of this embodiment, not only can the corresponding relationship between the protective cover information and the color information be determined, but this invention increases the likelihood that the user will purchase a protective cover 90 of the same brand as the electronic device 1.

Figure 6:
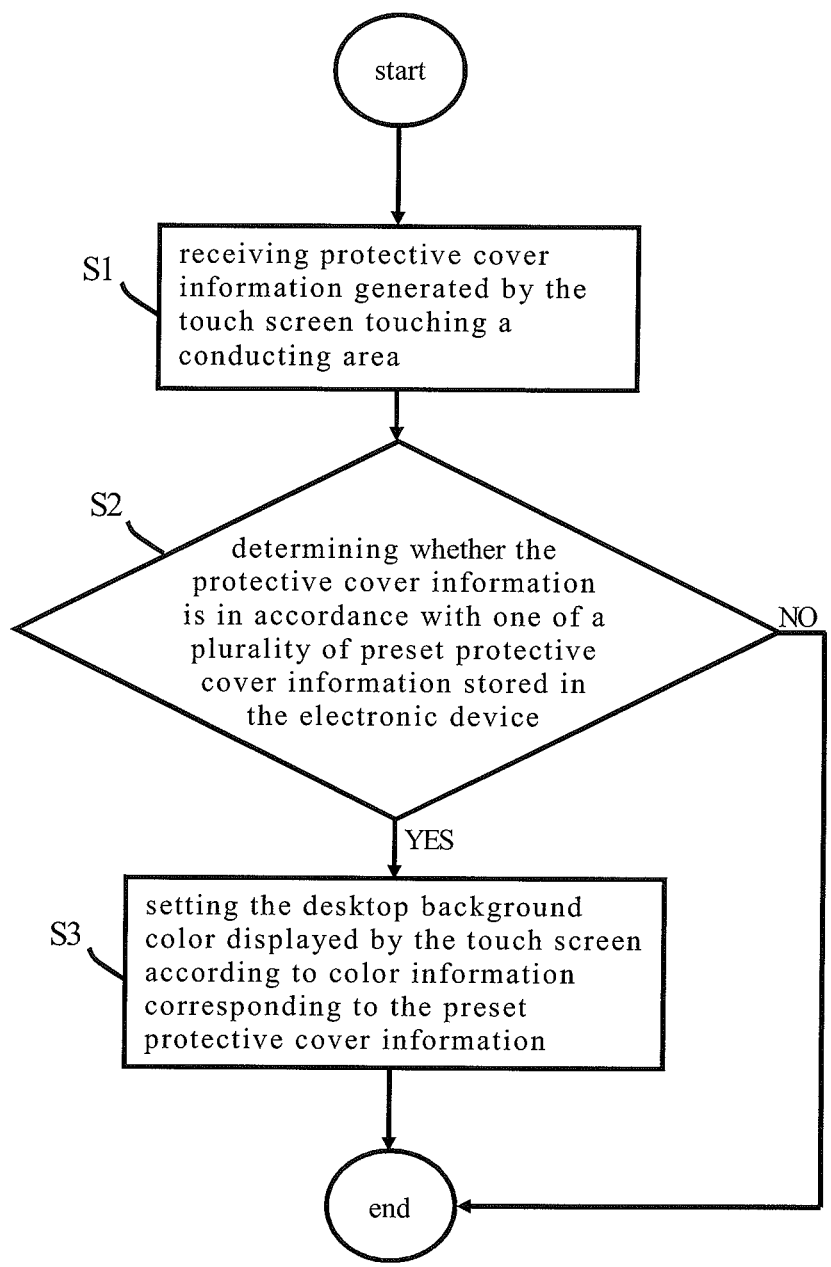
FIG. 6 is a step flow chart for the automatic method of setting a desktop background color of the present invention.

Please refer to FIG. 6 along with FIG. 2 and FIG. 4, in which detailed steps of the automatic method of setting a desktop background color according to the present invention are illustrated. FIG. 6 is a step flow chart of the automatic method of setting a desktop background color of the present invention. It should be noted that the electronic device 1 is used as an example in the following description illustrating the automatic method of setting a desktop background color disclosed in the present invention. However, the scope of the present invention is not limited by the abovementioned electronic device 1.

First, step S1 is executed: receiving protective cover information generated by the touch screen touching a conducting area.

As shown in FIG. 3, the automatic method of setting a desktop background color of the present invention is applied to an electronic device 1 with a touch screen 20. In the preferred embodiments, it is necessary that the electronic device 1 be combined with a special protective cover 90 in use. A cover body 91 used for covering the touch screen 20 of the protective cover 90 has a conducting area 911 and a non-conducting area 912, wherein a conducting area 911 of the cover body 91 of the protective cover 90 having a different color has a different shape, location, or area.

As shown in FIG. 2 and FIG. 3, when a user combines the abovementioned protective cover 90d with the electronic device 1, and the touch screen 20 is covered by the cover body 91 of the protective cover 90, the touch screen 20 generates corresponding protective cover information according to the location where the conducting area 911 touches the screen. Accordingly, once the user causes the cover body 91 to touch the touch screen 20, the control system 30 receives protective cover information generated by the touch screen 20.

Step S2: determining whether the protective cover information is in accordance with one of a plurality of preset protective cover information stored in the electronic device.

As shown in FIG. 2 and FIG. 3, after the control system 30 receives the protective cover information, the control system 30 determines whether the protective cover information is in accordance with one of a plurality of preset protective cover information stored in the electronic device 1. As mentioned above, the plurality of preset protective cover information is set according to protective cover information generated by each conducting area 911 having a different shape, location, or area. In principle, the quantity of the matching colors of the protective cover 90 corresponds to the same quantity of the preset protective cover information.

Step S3: setting the desktop background color displayed by the touch screen according to color information corresponding to the preset protective cover information.

When step S2 is executed, then if it is determined that the received protective cover information is in accordance with one of the plurality of preset protective cover information, the control system 30 sets the desktop background color displayed on the touch screen 20 according to the color information corresponding to the preset protective cover information. As mentioned above, the setting of the corresponding relationship between the preset protective cover information and the color information depends on the corresponding relationship between a color of the protective cover 90 and the protective cover information generated by the touch screen 20 touched by the protective cover 90. Therefore, after the control system 30 completes the setting according to the corresponding relationship between the abovementioned preset protective cover information and the color information, the desktop background color displayed by the touch screen 20 is consistent with the color of the protective cover 90. On the other hand, if the received protective cover information is not in accordance with any preset protective cover information, the desktop background color does not change and remains the same.

It should be noted that the automatic method of setting a desktop background color of the present invention is not limited to the step sequence mentioned above. As long as the objectives of the present invention are completed, the step sequence mentioned above also can be changed.

Based on the abovementioned illustration, the electronic device 1 can set the corresponding relationship between the preset protective cover information and the color information according to the corresponding relationship between the protective cover information generated when the cover body 91 of the protective cover 90 in use touches the touch screen 20 and the color of the protective cover 90, such that the electronic device 1 can automatically set the desktop background color displayed by the touch screen 20 to be consistent with the color of the protective cover 90 via executing the automatic method of setting a desktop background color disclosed in the present invention after the cover body 91 touches the touch screen 20.

While the present invention has been particularly shown and described with reference to a preferred embodiment, it will be understood by those skilled in the art that various changes and modifications can be made to the described embodiments. It is intended to include all such variations, modifications, and equivalents which fall within the scope of the invention, as defined in the accompanying claims; it is to be understood that many other possible modifications and variations can be made without departing from the spirit and scope of the invention as hereinafter claimed.

What is claimed is:

1. An automatic method of setting a desktop background color used for setting a desktop background color of an electronic device such that the desktop background color displayed by a touch screen of the electronic device is consistent with a color of a protective cover combined with the electronic device, a cover body of the protective cover used for covering the touch screen having a conducting area and a non-conducting area, wherein each protective cover of a different color has a different conducting area of the cover body in terms of shape, location, or area, the method comprising the following steps:

receiving protective cover information generated by the touch screen touching the conducting area;

determining whether the protective cover information is in accordance with one of a plurality of preset protective cover information stored in the electronic device; and if yes, setting the desktop background color displayed by the touch screen according to color information corresponding to the present protective cover information such that the desktop background color is consistent with the color of the protective cover, wherein the corresponding relationship between the preset protective cover information and the color information is determined and stored in the electronic device in advance.

2. The method as claimed in claim 1, wherein the non-conducting area is a through hole of the cover body.

3. The method as claimed in claim 2, wherein the through hole is located in a central position of the cover body, and the shape of the through hole is a circle, a rectangle, or a triangle depending on the color of the protective cover.

4. The method as claimed in claim 1, wherein the non-conducting area is located on an inner surface touching the touch screen when the cover body covers the touch screen.

5. The method as claimed in claim 4, wherein the shape of the non-conductive area is a product logo.

6. An electronic device, combined with a protective cover in use, the protective cover comprising a cover body, and the cover body having a conducting area and a non-conducting area, wherein each protective cover of a different color has a different conducting area of the cover body in terms of shape, location, or area, the electronic device comprising:

a main body, combining with the protective cover;

a touch screen, connected with the main body, used for generating protective cover information after touching the conducting area; and a control system, electrically coupled with the touch screen, used for receiving the protective cover information and for determining whether the protective cover information is in accordance with one of a plurality of preset protective cover information after receiving the protective cover information; when the protective cover information is in accordance with one of the plurality of preset protective cover information, the desktop background color displayed by the touch screen is set according to color information corresponding to the preset protective cover information such that the desktop background color is consistent with the color of the protective cover, wherein the corresponding relationship between the preset protective cover information and the color information is determined and stored in the electronic device in advance.

7. The electronic device as claimed in claim 6, wherein the non-conducting area is a through hole of the cover body.

8. The electronic device as claimed in claim 7, wherein the through hole is located in a central position of the cover body, and the shape of the through hole is a circle, a rectangle, or a triangle depending on the color of the protective cover.

9. The electronic device as claimed in claim 6, wherein the non-conducting area is located on an inner surface touching the touch screen when the cover body covers the touch screen.

10. The electronic device as claimed in claim 9, wherein the shape of the non-conductive area is a product logo.

* * * * *